A. J. PODMORE.
WATER CLOSET.
APPLICATION FILED APR. 3, 1908.

1,056,361.

Patented Mar. 18, 1913.

WITNESSES:
Jas. C. Nobrasmith
Mae Hofmann

INVENTOR
Arthur J. Podmore,
BY
Mot Croasdale
ATTORNEY.

UNITED STATES PATENT OFFICE.

ARTHUR J. PODMORE, OF CAMDEN, NEW JERSEY, ASSIGNOR OF ONE-HALF TO THOMAS MUNROE DOBBINS, OF PHILADELPHIA, PENNSYLVANIA.

WATER-CLOSET.

1,056,361.  Specification of Letters Patent.  Patented Mar. 18, 1913.

Application filed April 3, 1908. Serial No. 424,942.

*To all whom it may concern:*

Be it known that I, ARTHUR J. PODMORE, a citizen of the United States, and a resident of Camden, in the county of Camden and State of New Jersey, have invented a new and useful Water-Closet, of which the following is a specification.

My invention relates to improvements in water closets.

My object is to provide an improved pan closet, especially adapted for hospital and sick room use.

My invention may also include the advantages of a pan closet, in combination with those of a siphon.

My invention also comprises improvements in details.

It is well known that the ordinary pan closet has distinct advantages in hospital and sick room use in order that the condition of the patient can be ascertained. The usefulness of the ordinary pan closet is often impaired by the lack of means for separating the urine from the stool, and the principal object of my invention is to provide such means. It is also well known that the ordinary pan closet, which has in combination with the receiving pan a simple S-trap, is unhygenic as compared with the better types of siphon closet, because the ordinary S-trap is shallow and is not efficacious for preventing the escape of gases therethrough. It is also well known that the suction action of a siphon closet carries away offensive odors. The disadvantage however of the ordinary siphon closet, for hospital practice, is that it is impossible to make the necessary observations with respect to the condition of the patient. By combining therefore the advantages of the two types of closet with the separating means above referred to I have produced a new and useful device for such special service.

Figure 1:
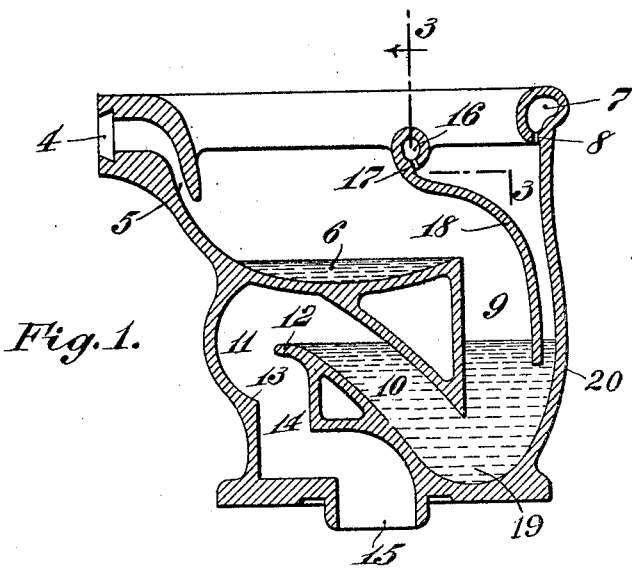
Figure 2:
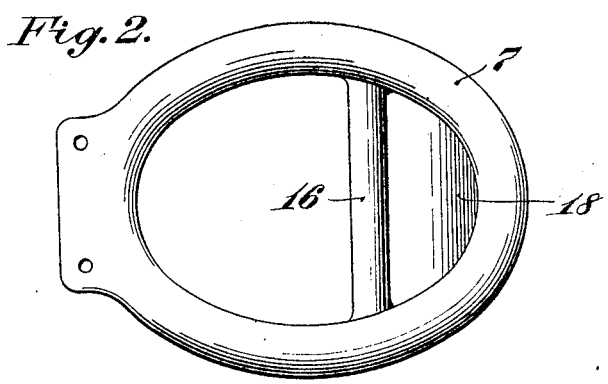
Figure 3:
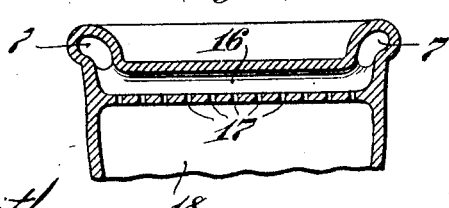

In the drawings Figure 1 is a longitudinal vertical section of my improved closet made of earthen ware, vitreous china, or similar suitable material. Fig. 2 is a plan view of same and Fig. 3 is a section on 3, 3 of Fig. 1.

Similar numerals refer to similar parts throughout the several views.

4 indicates the inlet from the supply tank, 5 the channel leading downwardly and discharging into the pan 6.

7 is the rim channel which is supplied from inlet 4 and discharges through a series of apertures 8 within the bowl.

The downwardly extending channel 9 leads from the discharge side of the pan 6 to the upwardly inclined channel 10 which discharges into the upper part of siphon chamber 11. It will be noted that the projecting end 12 of the lower wall of channel 10 nearly overhangs the lower portion of the curved wall 13 so that, as the water flows over the end of 12, it strikes the said curved wall and is projected thereby across the opening 14 to close said opening and form an efficient suction therein as the water is carried to the outlet 15 which connects with the soil pipe. It will also be noted that the proportions and positions of channels 9 and 10 secure an efficient trap of approximately three inches of water.

Transversely to the longitudinal extension of the closet structure I provide the extension 16. The extension 16 is preferably hollow and communicates with the rim channel 7, and is provided with vents 17. From this transverse extension 16, extends the curved inclined apron or partition 18. This partition 18 extends entirely across the width of the bowl and serves to divert the urine from the pan, as and for the purpose above described. The upper side of partition 18 is flushed or washed by the water passing through the vents 17. It will thus be noted that the lower extension of apron 18 projects slightly below the horizontal plane of the extreme end 12 of the lower wall of channel 10 and, consequently, below the normal water level in the well or reservoir 19 at the bottom of the bowl, and that the apron is so disposed relatively to front wall 20 of the bowl as to provide a channel for the urine to the well 19. It will thus be clear that upon the flushing of the closet the entire deposit therein will be carried away through channel 10 and waste outlet 15.

What I claim is:—

1. In a flushing water closet for analytical purposes, the combination, in an integral body of earthenware or similar substance, of a shallow pan, a siphoning water trapped discharge therefor, a partition for diverting the urine from the pan and leading it to said discharge, a flushing channel connected with the flushing rim, and means connected with the said flushing channel for flushing the partition simultaneously with the flushing of the pan.

2. In a water closet for analytical purposes, the combination, in an integral body of earthenware or similar substance having a common well at the bottom thereof, of a shallow pan, a channeled flushing rim and a siphon discharge therefor, a transverse flushing channel and an apron extending therefrom for diverting the urine from the pan, substantially as and for the purpose specified.

3. An integral earthenware water closet structure, comprising a shallow pan, means for flushing same, a trapped channel leading from the discharge edge of the pan, and an apron having at its upper extension, a flushing rim integrally connected with the means for flushing the pan, separated from the front wall of the bowl and extending from over the discharge edge of the pan downwardly into said channel and so positioned as to divert the urine from the pan.

4. In an earthenware water closet having a well at the bottom of the bowl adapted to contain a quantity of water and an opening communicating with the waste, the combination of a pan and a partition above the front of the pan for intercepting the urine, said partition extending into the well to below the normal water line therein and being so disposed relatively to the front wall of the bowl as to form therewith a channel leading to the well.

5. In an earthenware water closet having a well at the bottom of the bowl adapted to contain a quantity of water and an opening for communication with the waste, the combination of a pan, a partition above the front of the pan for intercepting the urine, said partition extending into the well to below the normal water line therein and being so disposed relatively to the front wall of the bowl as to form therewith a narrow channel leading to the well, and means for simultaneously flushing both the pan and the partition, whereby the contents of the pan and of the well are simultaneously discharged through the waste opening.

ARTHUR J. PODMORE.

Witnesses:
MAE HOFFMANN,
HOWARD S. OKIE.